United States Patent
Choi

[11] Patent Number: 5,917,800
[45] Date of Patent: Jun. 29, 1999

[54] OPTICAL PICKUP DEVICE FOR REPRODUCING DISCS OF TWO TYPES WITH DIFFERENT DENSITIES BY DOUBLE BEAM FOCUSES OF DIFFERENT SIZES

[75] Inventor: Yang-Oh Choi, Seoul, Rep. of Korea

[73] Assignee: Daewoo Electronics Co., Ltd., Seoul, Rep. of Korea

[21] Appl. No.: 08/847,474

[22] Filed: Apr. 25, 1997

[30] Foreign Application Priority Data

| Apr. 26, 1996 | [KR] | Rep. of Korea | 96-13023 |
| Apr. 26, 1996 | [KR] | Rep. of Korea | 96-13024 |
| Apr. 26, 1996 | [KR] | Rep. of Korea | 96-13026 |

[51] Int. Cl.$^6$ .................................................. G11B 7/00
[52] U.S. Cl. ........................... 369/112; 369/110; 369/109
[58] Field of Search ..................... 369/112, 118, 369/109, 110, 44.23, 44.24, 44.12

[56] References Cited

U.S. PATENT DOCUMENTS

| 5,072,437 | 12/1991 | Chikuma | 369/118 |
| 5,121,378 | 6/1992 | Hirose et al. | 369/118 |
| 5,281,797 | 1/1994 | Tatsuno et al. | 369/112 |
| 5,513,158 | 4/1996 | Ohsato | 369/112 |
| 5,590,110 | 12/1996 | Sato | 369/44.24 |
| 5,600,614 | 2/1997 | Katayama et al. | 369/112 |
| 5,612,942 | 3/1997 | Tkakahashi | 369/112 |
| 5,615,050 | 3/1997 | Kant | 369/112 |
| 5,615,199 | 3/1997 | Tatsuno et al. | 369/112 |
| 5,638,353 | 6/1997 | Takahashi | 369/112 |
| 5,659,533 | 8/1997 | Chen et al. | 369/118 |
| 5,701,286 | 12/1997 | Sato | 369/112 |
| 5,701,288 | 12/1997 | Seong | 369/112 |
| 5,724,334 | 3/1998 | Ohba et al. | 369/118 |
| 5,734,637 | 3/1998 | Ootaki et al. | 369/118 |
| 5,737,299 | 4/1998 | Yoo et al. | 369/112 |
| 5,748,603 | 5/1998 | Kim et al. | 369/112 |

*Primary Examiner*—Nabil Hindi
*Attorney, Agent, or Firm*—Jacobson, Price, Holman & Stern

[57] ABSTRACT

A beam generated from a laser light source are reflected by a beam splitter to proceed toward an optical disc. The beam focus onto the optical disc via a selective light-transmitting part installed in front of the optical disc and an objective lens. The beam is totally transmitted through an inner circular portion of the selective light-transmitting part and half transmitted through a peripheral portion of the selective light-transmitting part. The beam transmitted through the inner circular portion forms the larger beam spot on the disc while the beam transmitted through the peripheral portion forms the smaller beam spot, so that spherical aberration to be occurred due to change of the thickness of the optical disc is minimized by using the beam with smaller numerical aperture which has transmitted through the inner circular portion of the selective light-transmitting part.

21 Claims, 4 Drawing Sheets

OPTICAL PICKUP DEVICE FOR REPRODUCING DISCS OF TWO TYPES WITH DIFFERENT DENSITIES BY DOUBLE BEAM FOCUSES OF DIFFERENT SIZES

BACKGROUND OF THE INVENTION

1. Field of the Invention

The present invention relates to an optical pickup device, and more particularly to an optical pickup device capable of reproducing discs of two types having different densities by double beam focuses of different sizes.

2. Description of the Prior Art

Information reproducing/recording systems for using optical discs such as laser discs or compact discs have been developed in recent years. Such optical discs have a variety of information, e.g., generally, a digital audio disc is associated with the reproducing of musical sounds and a digital video disc is with the reproducing of images. These discs are recorded with information at a proper recording density in accordance with the purpose of usage. For example, the digital audio disc for reproducing musical sounds is recorded with smaller density, and the digital video disc for reproducing images is with larger density, e.g., as many as four times. The information stored into the inside of the above-mentioned discs is readable/writable by means of optical pickup devices, and can reproduce the discs of different kinds having different densities by means of optical pickup devices of different kinds.

A construction and operation of a general optical pickup device is disclosed in U.S. Pat. No. 4,767,921 or 4,868,377.

The conventionally general optical pickup device will be described in detail with reference to FIG. 1 below.

Figure 1:
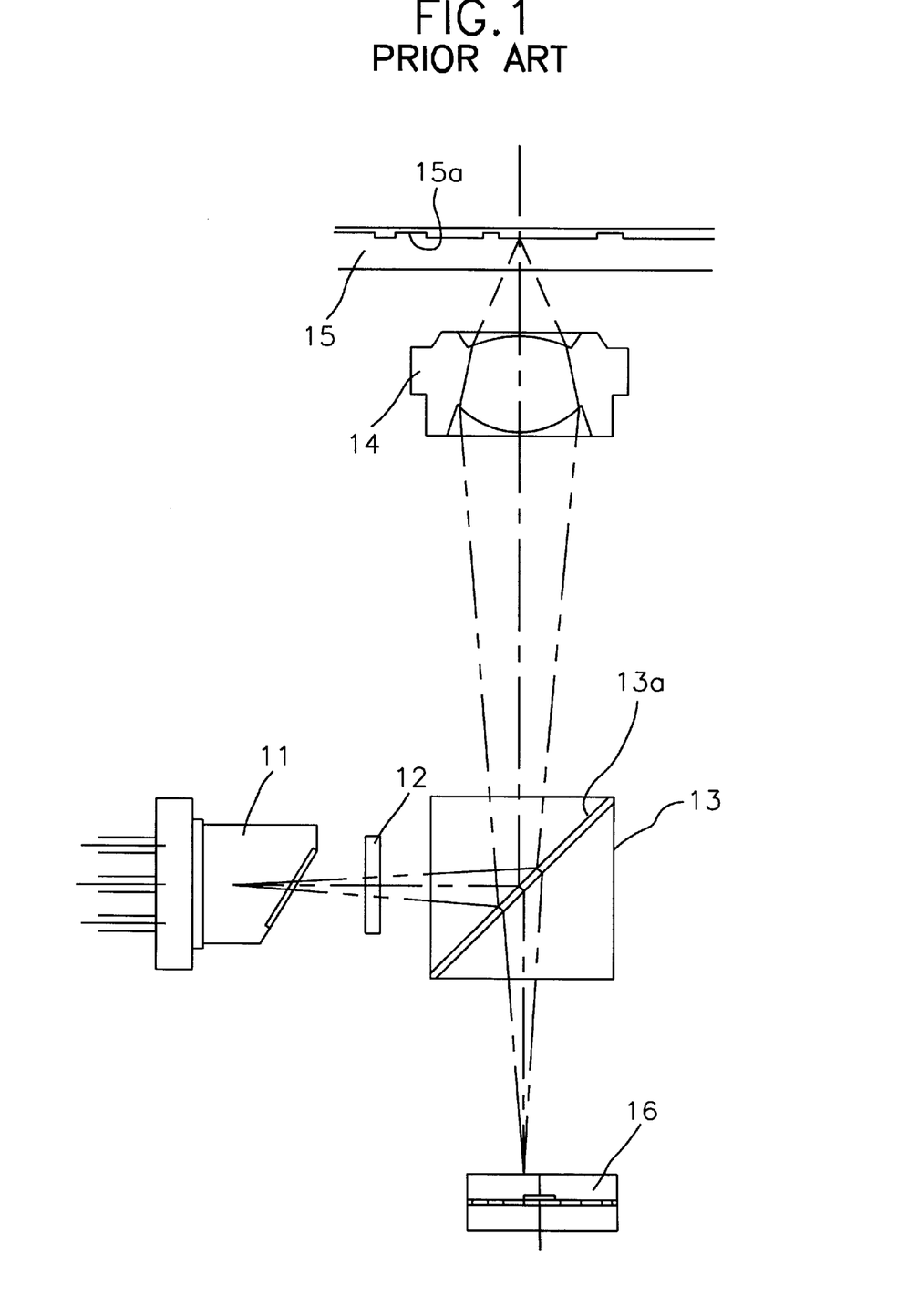
FIG. 1 is a schematic view showing a conventional optical pickup device.

FIG. 1 is a schematic view showing the conventionally general optical pickup device. In FIG. 1, a reference numeral 11 denotes a light source for generating laser beam, which is a laser diode 11. The laser beam emitted from laser diode 11 is diffracted while transmitting through a diffraction grating 12. The diffracted beam proceeds toward a beam splitter 13.

Here, beam splitter 13 is provided in such a manner that two right-angled prisms are installed to oppose to each other against respective inclination planes of 45°, and a coating layer 13a is formed along the contacting portion of the prisms, thereby transmitting some of the incident beam and reflecting the other incident beam to be perpendicular to the incident beam while securing the property of travelling straight of the incident beam.

The diffracted beam is reflected toward optical disc 15 by means of beam splitter 13. The beam reflected from beam splitter 13 focuses onto a recording plane 15a of an optical disc 15 while passing through an objective lens 14 installed in front of a recording medium such as optical disc 15. A positional accuracy, i.e., focusing error and tracking error, of the pickup device with respect to optical disc 15 is detected from an image of the beam received into a photodetector 16, and therefore, the focusing and tracking are controllable. Also, the information is read out on the basis of the amount of the reflected light determined by pits in recording plane 15a of optical disc 15.

Meantime, if the recording capacity of the disc is to be four times like the digital video disc over the digital audio disc, the width of pits in the disc is consequently decreased by ½. For this reason, a focused spot size onto the digital video disc should be half of that onto the digital audio disc with the consequence of necessarily employing different optical pickup devices in reproducing the digital video disc and digital audio disc by means of the conventional optical pickup devices. That is, in order to accurately read out data respectively recorded on the digital audio disc and digital video disc, it is required to separately apply an optical pickup device for digital audio disc of which beam spot size is approximately 1.6 $\mu$m when focusing onto the digital audio disc and an optical pickup device for digital video disc of which beam spot size is approximately 0.8 $\mu$m when focusing onto the digital video disc.

SUMMARY OF THE INVENTION

Therefore, it is an object of the present invention to provide an optical pickup device capable of reproducing discs of two kinds having different densities by forming double beam focuses of different sizes.

To achieve the above object of the present invention, an optical pickup device includes a laser light source for generating laser beam to record or reproducing data of an optical disc, and a beam splitter arranged onto an optical path of the beam generated from the laser light source for partially reflecting and partially transmitting the laser beam. Also, a selective light-transmitting part has an inner circular part for transmitting the laser beam with a first transmittance and a peripheral portion for transmitting the laser beam with a second transmittance. Additionally, an objective lens leads the laser beam proceeding toward the optical disc to focus onto the optical disc, and a light-receiving part receives the laser beam reflected from the optical disc.

Preferably, the selective light-transmitting part may be a circular light-transmitting plate of which the peripheral portion is shaped as a ring.

The first transmittance is higher than the second transmittance. Preferably, the inner circular portion is a totally transmitted one of which the transmittance is 1 and the peripheral portion is a half transmitted one of which the transmittance is ½.

A difference between spot sizes focusing on the disc is adjustable by properly regulating an outermost angle of incidence of the laser beam which is transmitted through the inner circular portion of the selective light-transmitting part.

Also, diffraction grating is installed between the laser light source and the beam splitter for controlling tracking and focusing.

As another aspect of the present invention, an optical pickup device includes a hologram device which has a laser light source for generating laser beam, a hologram grating for transmitting the beam emitted from the laser light source and diffracting the beam incident after being reflected from an optical disc, and a light-receiving part for receiving the beam diffracted by the hologram grating. Also, a selective light-transmitting part has an inner circular portion for transmitting the laser beam with a first transmittance and a peripheral portion for transmitting the laser beam with a second transmittance. Additionally, an objective lens leads the laser beam proceeding toward the optical disc to focus onto the optical disc, and a light-receiving part receives the laser beam reflected from the optical disc.

Preferably, the selective light-transmitting part may be a circular light-transmitting plate of which the peripheral portion is shaped as a ring.

The first transmittance is higher than the second transmittance. Preferably, the inner circular portion is a totally transmitted one of which the transmittance is 1 and the peripheral portion is a half transmitted one of which the transmittance is ½.

A difference between spot sizes focusing on the disc is adjustable by properly regulating an outermost angle of incidence of the laser beam which is transmitted through the inner circular portion of the selective light-transmitting part.

Also, diffraction grating is installed between the laser light source in the hologram device and the hologram grating for controlling tracking and focusing.

As still another aspect of the present invention, an optical pickup device includes a laser light source for generating laser beam, and a selective light-transmitting part having an inner circular portion for transmitting the laser beam with a first transmittance and a peripheral portion for transmitting the laser beam with a second transmittance. An objective lens is installed in front of an optical disc and leads the laser beam transmitted through the selective light-transmitting part to focus onto the optical disc.

A hologram grating is installed between the selective light-transmitting part and the objective lens for transmitting the beam emitted from the laser light source and diffracting the beam incident after being reflected from an optical disc. A light-receiving part is installed for receiving the beam diffracted by the hologram grating. Thereby, the beam irradiated from the laser light source proceeds toward the optical disc via the selective light-transmitting part and the hologram grating in order and the beam reflected from the optical disc is diffracted by the hologram grating to be received into the light-receiving part.

A diffraction grating is installed between the laser light source and the selective light-transmitting part for controlling tracking and focusing.

The optical pickup device further comprises a prism, on both sides of which the selective light-transmitting part and the hologram grating is integrally installed.

According to the optical pickup device of the present invention as described above, when the laser beam transmits through the selective light-transmitting part, the laser beam transmitted through the inner circular portion forms the larger beam spot onto the disc and the laser beam transmitted through the peripheral portion forms the smaller beam spot. By doing so, double beam focuses of different sizes can be formed by the use of the single optical pickup device, thereby making it possible to reproduce discs of two types with different densities by means of the single optical pickup device.

As a result, in case of the digital audio disc and digital video disc having different recording capacities from each other, both discs can be reproduced when employing the optical pickup device according to the present invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

An optical pickup device according to the present invention will be described in detail with reference to accompanying drawings.

Embodiment 1

Figure 2:
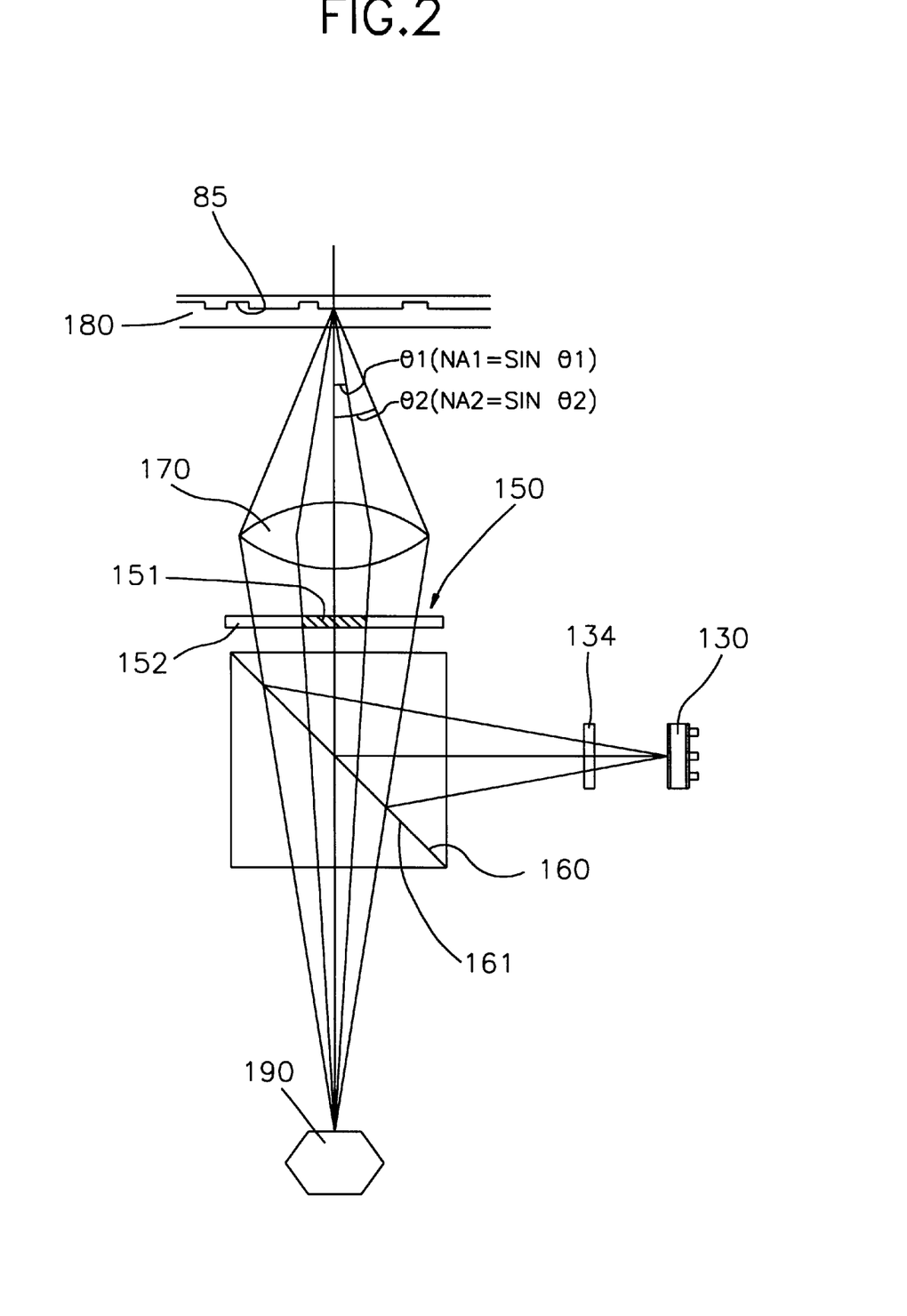
FIG. 2 is a schematic view showing an optical pickup device according to a first embodiment of the present invention.

FIG. 2 is a schematic view showing the optical pickup device according to a first embodiment of the present invention.

In this embodiment, as shown in FIG. 2, is installed a laser diode 130 as a light source that generates a laser beam.

Here, a beam splitter 160 is disposed onto an optical path of the beam generated from laser diode 130. In more detail, beam splitter 160 has a cubic shape that two right-angle-triangular bars are contacted in such a manner that the respective inclined planes of 45° are faced to each other, and a coating layer 161 which partially reflects and partially transmits a laser beam is formed along the contacting portion of the prisms. The coating layer 161 is so formed that some of the incident beam is transmitted therethrough and the other of the incident beam is reflected by the coating layer to be perpendicular to the incident beam, while securing the property of travelling straight of the incident beam.

The laser diode 130 is so positioned that the laser beam irradiated from the diode 130 is incident on the coating layer with the incident angle of 45°.

Optical disc 180 is placed onto the path of the beam which is reflected to proceed. That is, optical disc 180 is placed at the perpendicular direction to the laser diode 130 centering on the beam splitter 160.

A diffraction grating 134 is installed between the laser light diode 130 and the beam splitter 160 for controlling tracking and focusing.

A selective light-transmitting part 150 is installed in front of optical disc 180. Selective light-transmitting part 150 consists of an inner circular portion 151 that transmits the laser beam with the first transmittance and a peripheral portion 152 that transmits the laser beam with the second transmittance. Selective light-transmitting part 150 may be preferably formed by a circular light-transmitting plate of which peripheral portion 152 is in the form of a ring. The first transmittance is so determined as to be higher than the second transmittance. Preferably, inner circular portion 151 is a totally transmitted one of which the transmittance is 1 and peripheral portion 152 is a half transmitted one of which the transmittance is ½.

An objective lens 170 is installed between optical disc 180 and selective light-transmitting part 150 for permitting the beam transmitted through selective light-transmitting part 150 to focus onto a recording plane 185 of optical disc 180. Objective lens 170 is an unspherical lens to minimize spherical aberration. Objective lens 170 is preferably a lens for DVD so that the beam transmitted through selective light-transmitting part 150 can reproduce digital video disc (DVD) with 0.6 mm thickness.

A photodetector 190 is installed at the opposite side of optical disc 180 centering on beam splitter 160 to receive the laser beam reflected from optical disc 180.

Hereinafter, an operation according to the foregoing embodiment will be described.

The laser beam is irradiated from laser diode 130 toward beam splitter 160. The laser beam is divided into three beams while transmitting through diffraction grating 134.

The divided beams are incident on beam splitter 160, and incident on coating layer 161 with an incident angle of 45°. The laser beams are partially transmitted, and partially reflected to be bent by right angles with respect to the incident light by means of coating layers 161. Then, the beams proceeds toward optical disc 180.

The beam passes through selective light-transmitting part 150 installed in front of optical disc 180. The beam totally transmits through inner circular portion 151 of selective light-transmitting part 150, and half transmits through peripheral portion 152 of selective light-transmitting part 150.

The transmitted beam is to focus onto recording plane 185 of optical disc 180 by means of objective lens for DVD 170 installed between optical disc 180 and selective light-transmitting part 150.

At this time, the laser beam, which totally transmits through inner circular portion 151 of the circular light-transmitting plate 150, focuses onto optical disc 180 at an angle of θ1 via objective lens 170. At the same time, the laser beam, which half transmits through peripheral portion 152 of circular light-transmitting plate 150, focuses onto optical disc 180 at an angle of θ2 via objective lens 170

The laser beams focusing at the angles of θ1 and θ2 on the disc transmit through circular light-transmitting plate 150 via objective lens 170 to return to beam splitter 160. The returned beams having optical information partially transmit through coating layer 161 to be received into photodetector 190 installed to the lower portion of beam splitter 160, and are thus demodulated into original signals.

At this time, two different numerical apertures (N.A.) are produced by inner circular portion 151 and peripheral portion 152 of circular light-transmitting plate 150. By these two different numerical apertures, two beam spots of different sizes are formed onto optical disc 180. Due to this fact, a difference appears in the quantities of light.

That is, N.A.1=η sin θ1 and N.A.2=η sin θ1 (where η denotes a refractive index of a medium, and θ is an angle formed between an optical axis and outermost incident beam).

At this time, a diameter of the beam $W_0$ is written as:

$W_0 = K*\lambda/N.A.$ (where K is a constant), and $D_0$ (focal depth)$= R*\lambda/(N.A.)^2$ (where R is a constant).

Thus, along with the change of the numerical aperture, the beam size and focal depth become changed.

Therefore, the beam focusing by the outermost angle of incidence θ2 after passing through peripheral portion 152 of circular light-transmitting plate 150 has smaller beam size and focal depth than those of the beam focusing by the outermost incident angle θ1 by objective lens 170 after passing through inner circular portion 151. This is because the beam size is in inverse proportion to N.A. and the focal depth is in inverse proportion to $(N.A.)^2$.

When optical disc 180 is of the digital video disc of thickness 0.6 mm, the laser beam focusing on the optical disc via objective lens 170 after transmitting through light-transmitting plate 150 forms the beam spot of 0.8 μm size onto optical disc 180. Since the present objective lens is the lens for DVD, the beam can focus accurately without generation of spherical aberration on the recording surface of the digital video disc.

Meanwhile, When optical disc 180 is of the digital audio disc of thickness 1.2 mm, since the beams on and close by the optical axis totally transmit through inner circular portion 151 of circular light-transmitting plate 150, and the beams in the skirts of the optical axis half transmit through peripheral portion 152 of circular light-transmitting plate 150, the numerical aperture N.A. of the beam focusing onto the disc via objective lens 170 becomes smaller as N.A.1. Therefore, spherical aberration to be occurred due to the difference of 0.6 mm in thickness as compared with the digital video disc is sharply decreased due to the smaller numerical aperture N.A.1. Thus, digital audio disc with larger width of the pit can be reproduced.

That is, when reproducing digital audio disc, spherical aberration is to be occurred due to the difference of 0.6 mm in thickness as compared with digital video disc.

At this time, the spherical aberration is $$(\Delta d/8)*\{(\eta^2-1)\eta^3\}*(N.A.)^4$$

(where Δd is a difference of thicknesses of the discs, η is a refractive index of a medium, and N.A. is a numerical aperture).

Accordingly, the beams on and close by the optical axis which occur smaller spherical aberration totally transmit through inner circular portion 151 of circular light-transmitting plate 150. Also, the beams which pass through the skirts of the lens occur larger spherical aberration and half transmit through peripheral portion 152 of circular light-transmitting plate 150. Thereby, the numerical aperture N.A. formed by the beam becomes smaller as N.A.1=η sin θ1. Therefore the spherical aberration is sharply decreased in proportion to $(N.A.)^4$. Also, since the numerical aperture becomes smaller as N.A.1=η sin θ1, the size of beam spot formed on the disc is larger as 1.6 μm in inverse proportion to (N.A.). Thus, digital audio disc with larger width of the pit can be reproduced.

Embodiment 2

Figure 3:
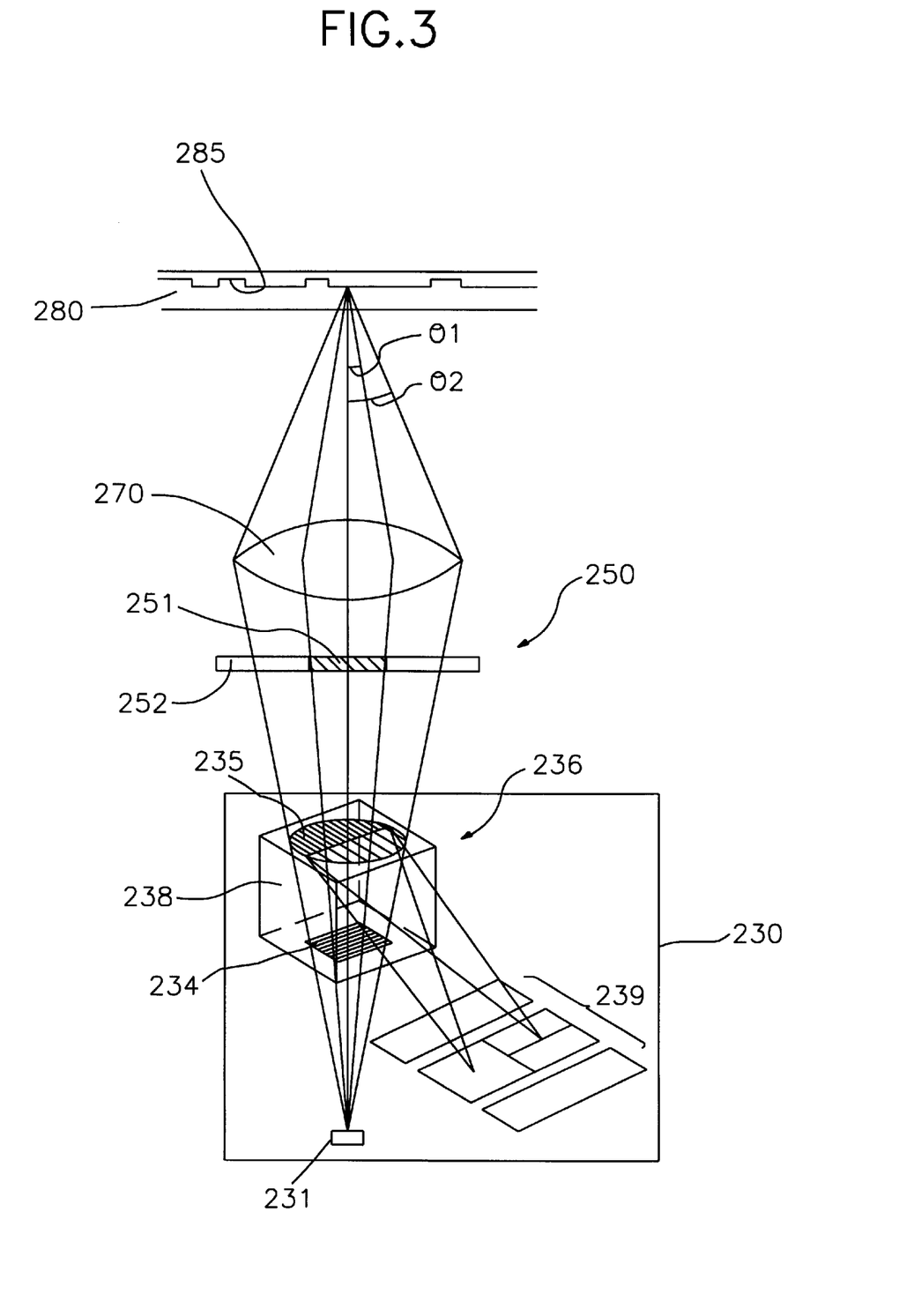
FIG. 3 is a schematic view showing the optical pickup device according to a second embodiment of the present invention.

FIG. 3 is a schematic view showing the optical pickup device according to a second embodiment of the present invention.

In this embodiment, as shown in FIG. 3, is installed a hologram device 230 which includes a laser diode 231 for generating laser beam, a hologram grating 235 which transmits the beam emitted from laser diode 231 and diffracts to radiate the beam incident after being reflected from an optical disc 280, and a photodetector 236 for receiving the beam diffracted by hologram grating 235.

In order to control the tracking and focusing, diffraction gratings 234 is respectively installed between laser diode 231 and hologram grating 235 within hologram device 230.

Optical disc 280 is placed onto the path of the beam which proceed after being transmitted through hologram grating 235. That is, optical disc 280 is placed on a straight line with laser diode 130 and hologram grating 235.

A selective light-transmitting part 250 is installed in front of optical disc 280. Selective light-transmitting part 250 consists of an inner circular portion 251 that transmits the laser beam with the first transmittance and a peripheral portion 252 that transmits the laser beam with the second transmittance. Selective light-transmitting part 250 may be preferably formed by a circular light-transmitting plate of which peripheral portion 252 is shaped as a ring. The first transmittance is so determined as to be higher than the second transmittance. Preferably, inner circular portion 251 is a totally transmitted one of which the transmittance is 1 and peripheral portion 252 is a half transmitted one of which the transmittance is ½.

An objective lens 270 is installed between optical disc 280 and selective light-transmitting part 250 for permitting the beam transmitted through selective light-transmitting part 250 to focus onto a recording plane 285 of optical disc 280. Objective lens 270 is an unspherical lens to minimize spherical aberration. Objective lens 270 is preferably a lens for DVD so that the beam transmitted through selective light-transmitting part 250 can reproduce digital video disc (DVD) with 0.6 mm thickness.

Hereinafter, an operation according to the foregoing embodiment will be described.

The laser beams are generated from laser diode 231 within hologram device 230. The laser beams are divided into three beams by diffraction grating 234.

The divided beams pass through diffraction grating 234 to go straight.

The beam passes through selective light-transmitting part 250 installed in front of optical disc 280. The beam totally transmits through inner circular portion 251 of selective light-transmitting part 250, and half transmits through peripheral portion 252 of selective light-transmitting part 250.

The beam is to focus onto recording plane 285 of optical disc 280 by means of objective lens for DVD 270 installed between optical disc 280 and selective light-transmitting part 250.

At this time, the laser beam, which totally transmits through inner circular portion 251 of the circular light-transmitting plate 250, focuses onto optical disc 280 at an angle of θ1 via objective lens 270. At the same time, the laser beam, which half transmits through peripheral portion 252 of circular light-transmitting plate 250, focuses onto optical disc 280 at an angle of θ2 via objective lens 270.

The laser beams focusing at the angles of θ1 and θ2 on the disc transmit through circular light-transmitting plate 250 via objective lens 270 to return to hologram device 230. The returned beams having optical information is diffracted by hologram grating 235 to be received into photodetector 290, and are thus demodulated into original signals.

At this time, two different numerical apertures (N.A.) are produced by inner circular portion 251 and peripheral portion 252 of circular light-transmitting plate 250. By these two different numerical apertures, two beam spots of different sizes are formed onto optical disc 280.

When optical disc 280 is of the digital video disc of thickness 0.6 mm, the laser beam focusing on the optical disc via objective lens 270 after transmitting through light-transmitting plate 250 forms the beam spot of 0.8 μm size onto optical disc 280. Since the present objective lens is the lens for DVD, the beam can focus accurately without generation of spherical aberration on the recording surface of the digital video disc.

Meanwhile, when optical disc 280 is of the digital audio disc of thickness 1.2 mm, since the beams on and close by the optical axis totally transmit through inner circular portion 251 of circular light-transmitting plate 250, and the beams in the skirts of the optical axis half transmit through peripheral portion 252 of circular light-transmitting plate 250, the numerical aperture N.A. of the beam focusing onto the disc via objective lens 270 becomes smaller as N.A.1. Therefore, spherical aberration to be occurred due to the difference of 0.6 mm in thickness as compared with the digital video disc is sharply decreased due to the smaller numerical aperture N.A.1. Thus, digital audio disc with larger width of the pit can be reproduced.

Embodiment 3

Figure 4:
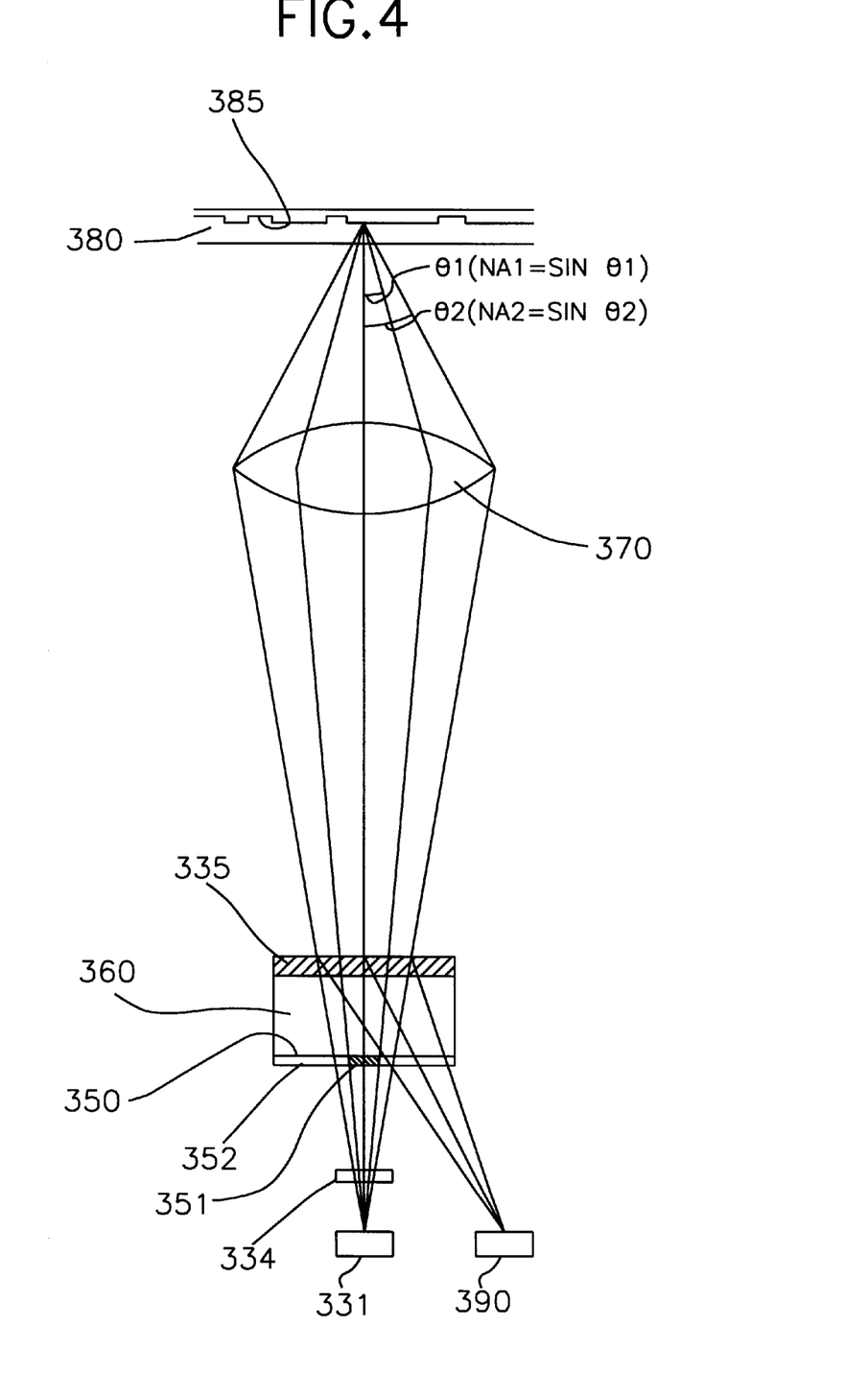
FIG. 4 is a schematic view showing the optical pickup device according to a third embodiment of the present invention.

FIG. 4 is a schematic view showing the optical pickup device according to a third embodiment of the present invention.

In this embodiment, as shown in FIG. 4, is installed a laser diode 331 for generating laser beams.

A prism 360 in rectangular or cubic shape is arranged onto an optical path of the beams generated from laser diode 331. On both sides of prism 360 a selective light-transmitting part 350 and a hologram grating 335 is integrally installed, and selective light-transmitting part 350 is arranged toward laser diode 350.

A diffraction grating 334 is arranged between laser diode 331 and selective light-transmitting part 350 for controlling the tracking and focusing.

Optical disc 380 is placed onto the optical path of the beam which goes straight after the beam irradiated toward prism 360 from laser diode 330 is transmitted through selective light-transmitting part 350 prism 360, and hologram grating 335, in order. That is, optical disc 380 is placed on a straight line with laser diode 330 and prism.

Selective light-transmitting part 350 consists of an inner circular portion 351 that transmits the laser beam with the first transmittance and a peripheral portion 352 that transmits the laser beam with the second transmittance. Selective light-transmitting part 350 may be preferably formed by a circular light-transmitting plate of which peripheral portion 352 is shaped as a ring. The first transmittance is so determined as to be higher than the second transmittance. Preferably, inner circular portion 351 is a totally transmitted one of which the transmittance is 1 and peripheral portion 352 is a half transmitted one of which the transmittance is ½.

An objective lens 370 is installed between optical disc 380 and hologram grating 335, permitting the beam transmitted through selective light-transmitting part 350, prism 360, and hologram grating 335 to focus onto a recording plane 385 of optical disc 380. Objective lens 370 is an unspherical lens to minimize spherical aberration. Objective lens 370 is preferably a lens for DVD so that the beam transmitted through selective light-transmitting part 350 can reproduce digital video disc (DVD) with 0.6 mm thickness.

The photodetector 390 is installed at a predetermined position for receiving the beam diffracted by hologram grating 335.

Hereinafter, an operation according to the foregoing embodiment will be described.

The laser beam is irradiated from laser diode 331 toward beam splitter 360. The laser beam is divided into three beams by means of diffraction grating 334.

The divided beams pass through selective light-transmitting part 350. The beam totally transmits through inner circular portion 351 of selective light-transmitting part 350, and half transmits through peripheral portion 352 of selective light-transmitting part 350.

The transmitted beam is to focus onto recording plane 385 of optical disc 380 by means of objective lens for DVD 370 installed in front of optical disc 380 via prism 360 and hologram grating 335.

At this time, the laser beam, which totally transmits through inner circular portion 351 of the circular light-transmitting plate 350, focuses onto optical disc 380 at an angle of θ1 via objective lens 370. At the same time, the laser beam, which half transmits through peripheral portion 352 of circular light-transmitting plate 350, focuses onto optical disc 380 at an angle of θ2 via objective lens 370.

The laser beams focusing at the angles of θ1 and θ2 on the disc transmit through circular light-transmitting plate 350 via objective lens 370 to return to hologram device 330. The returned beams having optical information is diffracted by hologram grating 335 to be received into photodetector 390, and are thus demodulated into original signals.

At this time, two different numerical apertures (N.A.) are produced by inner circular portion 351 and peripheral portion 352 of circular light-transmitting plate 350. By these two different numerical apertures, two beam spots of different sizes are formed onto optical disc 380.

When optical disc 380 is of the digital video disc of thickness 0.6 mm, the laser beam focusing on the optical disc via objective lens 370 after transmitting through light-transmitting plate 350 forms the beam spot of 0.8 µm size onto optical disc 380. Since the present objective lens is the lens for DVD, the beam can focus accurately without generation of spherical aberration on the recording surface of the digital video disc.

Meanwhile, When optical disc 380 is of the digital audio disc of thickness 1.2 mm, since the beams on and close by the optical axis totally transmit through inner circular portion 351 of circular light-transmitting plate 350, and the beams in the skirts of the optical axis half transmit through peripheral portion 352 of circular light-transmitting plate 350, the numerical aperture N.A. of the beam focusing onto the disc via objective lens 370 becomes smaller as N.A.1. Therefore, spherical aberration to be occurred due to the difference of 0.6 mm in thickness as compared with the digital video disc is sharply decreased due to the smaller numerical aperture N.A.1. Thus, digital audio disc with larger width of the pit can be reproduced.

According to the optical pickup device of the present invention as described above, when the laser beam transmits through the selective light-transmitting part, the laser beam transmitted through the inner circular portion forms the larger beam spot onto the disc and the laser beam transmitted through the peripheral portion forms the smaller and less light beam spot. By doing so, double beam focuses of different sizes can be formed by the use of the single optical pickup device, thereby making it possible to reproduce discs of two types with different densities by means of the single optical pickup device.

As a result, in case of the digital audio disc and digital video disc having different recording capacities from each other, both discs can be reproduced when employing the optical pickup device according to the present invention.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device for reproducing discs of two types with different densities by double beam focuses of different sizes comprising:
   a laser light source for generating laser beam to record or reproducing data of an optical disc;
   a beam splitter arranged onto an optical path of the beam generated from the laser light source for partially reflecting and partially transmitting the laser beam;
   a selective light-transmitting part having an inner circular part for totally transmitting the laser beam and a peripheral portion for half transmitting the laser beam;
   an objective lens for leading the laser beam proceeding toward the optical disc to focus onto the optical disc; and
   a light-receiving part for receiving the laser beam reflected from the optical disc.

2. An optical pickup device as claimed in claim 1, wherein the selective light-transmitting part is comprised of a circular light-transmitting plate of which peripheral portion is shaped as a ring.

3. An optical pickup device as claimed in claim 1, wherein the selective light-transmitting part is installed between the beam splitter and the objective lens for permitting the beam transmitted through the selective light-transmitting part to focus onto a recording plane of the optical disc via the objective lens.

4. An optical pickup device as claimed in claim 1, wherein a difference between spot sizes focusing on the disc is adjustable by properly regulating an outermost angle of incidence of the laser beam which has transmitted through the inner circular part of the selective light-transmitting part.

5. An optical pickup device as claimed in claim 1, further comprising a diffraction grating installed between the laser light source and the beam splitter for controlling tracking and focusing.

6. An optical pickup device for reproducing discs of two types with different densities by double beam focuses of different sizes comprising:
   a hologram device which has a laser light source for generating laser beam, a hologram grating for transmitting the beam emitted from the laser light source and diffracting the beam incident after being reflected from an optical disc, and a light-receiving part for receiving the beam diffracted by the hologram grating;
   a selective light-transmitting part having an inner circular portion for totally transmitting the laser beam and a peripheral portion for half transmitting the laser beam;
   an objective lens for leading the laser beam proceeding toward the optical disc to focus onto the optical disc; and
   a light-receiving part for receiving the laser beam reflected from the optical disc.

7. An optical pickup device as claimed in claim 6, wherein the selective light-transmitting part is comprised of a circular light-transmitting plate of which peripheral portion is shaped as a ring.

8. An optical pickup device as claimed in claim 6, wherein the selective light-transmitting part is installed between the beam splitter and the objective lens for permitting the beam transmitted through the selective light-transmitting part to focus onto a recording plane of the optical disc via the objective lens.

9. An optical pickup device as claimed in claim 6, wherein a difference between spot sizes focusing on the disc is adjustable by properly regulating an outermost angle of incidence of the laser beam which has transmitted through the inner circular part of the selective light-transmitting part.

10. An optical pickup device as claimed in claim 6, further comprising a diffraction grating installed between the laser light source and the hologram grating in the hologram device for controlling tracking and focusing.

11. An optical pickup device for reproducing discs of two types with different densities by double beam focuses of different sizes comprising:
    a laser light source for generating laser beam;
    a selective light-transmitting part having an inner circular portion for totally transmitting the laser beam and a peripheral portion for half transmitting the laser beam;
    an objective lens installed in front of an optical disc for permitting the laser beam transmitted through the selective light-transmitting part to focus onto the optical disc;

a hologram grating installed between the selective light-transmitting part and the objective lens for transmitting the beam emitted from the laser light source and diffracting the beam incident after being reflected from an optical disc; and a light-receiving part for receiving the beam diffracted by the hologram grating, wherein, the beam irradiated from the laser light source proceeds toward the optical disc via the selective light-transmitting part and the hologram grating in order, and the beam reflected from the optical disc is diffracted by the hologram grating to be received into the light-receiving part.

12. An optical pickup device as claimed in claim 11, further comprising a diffraction grating installed between the laser light source and the selective light-transmitting part for controlling tracking and focusing.

13. An optical pickup device as claimed in claim 11, further comprising a prism on both sides of which the selective light-transmitting part and the hologram grating is integrally installed.

14. An optical pickup device for reproducing discs of two types with different densities by double beam focuses of different sizes comprising:

a laser light source for generating laser beam to record or reproducing data of an optical disc;

a beam splitter arranged onto an optical path of the beam generated from the laser light source for partially reflecting and partially transmitting the laser beam;

a selective light-transmitting part having an inner circular part for transmitting the laser beam with a first transmittance and a peripheral portion for transmitting the laser beam with a second transmittance, wherein a difference between spot sizes focusing on the disc is adjustable by properly regulating an outermost angle of incidence of the laser beam which has been transmitted through the inner circular part of the selective light-transmitting part;

an objective lens for leading the laser beam proceeding toward the optical disc to focus onto the optical disc; and a light-receiving part for receiving the laser beam reflected from the optical disc.

15. An optical pickup device as claimed in claim 14, wherein the selective light-transmitting part is comprised of a circular light-transmitting plate of which peripheral portion is shaped as a ring.

16. An optical pickup device as claimed in claim 14, wherein the first transmittance is higher than the second transmittance.

17. An optical pickup device as claimed in claim 14, wherein the selective light-transmitting part is installed between the beam splitter and the objective lens for permitting the beam transmitted through the selective light-transmitting part to focus onto a recording plane of the optical disc via the objective lens.

18. An optical pickup device for reproducing discs of two types with different densities by double beam focuses of different sizes comprising:

a hologram device which has a laser light source for generating laser beam, a hologram grating for transmitting the beam emitted from the laser light source and diffracting the beam incident after being reflected from an optical disc, and a light-receiving part for receiving the beam diffracted by the hologram grating;

a selective light-transmitting part having an inner circular portion for transmitting the laser beam with a first transmittance and a peripheral portion for transmitting the laser beam with a second transmittance, wherein a difference between spot sizes focusing on the disc is adjustable by properly regulating an outermost angle of incidence of the laser beam which has been transmitted through the inner circular part of the selective light-transmitting part;

an objective lens for leading the laser beam proceeding toward the optical disc to focus onto the optical disc; and a light-receiving part for receiving the laser beam reflected from the optical disc.

19. An optical pickup device as claimed in claim 18, wherein the selective light-transmitting part is comprised of a circular light-transmitting plate of which peripheral portion is shaped as a ring.

20. An optical pickup device as claimed in claim 18, wherein the first transmittance is higher than the second transmittance.

21. An optical pickup device for reproducing discs of two types with different densities by double beam focuses of different sizes comprising:

a laser light source for generating laser beam;

a selective light-transmitting part having an inner circular portion for transmitting the laser beam with a first transmittance and a peripheral portion for transmitting the laser beam with a second transmittance, wherein a difference between spot sizes focusing on the disc is adjustable by properly regulating an outermost angle of incidence of the laser beam which has been transmitted through the inner circular part of the selective light-transmitting part;

an objective lens installed in front of an optical disc for permitting the laser beam transmitted through the selective light-transmitting part to focus onto the optical disc;

a hologram grating installed between the selective light-transmitting part and the objective lens for transmitting the beam emitted from the laser light source and diffracting the beam incident after being reflected from an optical disc; and a light-receiving part for receiving the beam diffracted by the hologram grating, wherein, the beam irradiated from the laser light source proceeds toward the optical disc via the selective light-transmitting part and the hologram grating in order, and the beam reflected from the optical disc is diffracted by the hologram grating to be received into the light-receiving part.

* * * * *